US00RE42473E

(19) United States
(12) Reissued Patent
Gorian et al.

(10) Patent Number: US RE42,473 E
(45) Date of Reissued Patent: Jun. 21, 2011

(54) RENDERING IMAGES UTILIZING ADAPTIVE ERROR DIFFUSION

(75) Inventors: Izrail S. Gorian, Watertown, MA (US); Jay E. Thornton, Watertown, MA (US); Richard A. Pineau, North Andover, MA (US)

(73) Assignee: Senshin Capital, LLC, Wilmington, DE (US)

(21) Appl. No.: 11/847,894

(22) Filed: Aug. 30, 2007 (Under 37 CFR 1.47)

Related U.S. Patent Documents

Reissue of:
(64) Patent No.: 6,937,365
Issued: Aug. 30, 2005
Appl. No.: 09/870,537
Filed: May 30, 2001

(51) Int. Cl.
*H04N 1/405* (2006.01)

(52) U.S. Cl. ..... 358/1.9; 358/3.03; 358/3.04; 358/3.05; 382/252

(58) Field of Classification Search ..... 358/3.03, 358/3.04, 3.05, 1.9, 2.99, 3.01, 3.06; 382/252
See application file for complete search history.

(56) References Cited

U.S. PATENT DOCUMENTS

| | | | |
|---|---|---|---|
| 3,820,133 | A | 6/1974 | Adorney et al. |
| 3,864,708 | A | 2/1975 | Allen |
| 4,070,587 | A | 1/1978 | Hanakata |
| 4,072,973 | A | 2/1978 | Mayo |
| 4,089,017 | A | 5/1978 | Buldini |
| 4,154,523 | A | 5/1979 | Rising et al. |
| 4,168,120 | A | 9/1979 | Freier et al. |
| 4,284,876 | A | 8/1981 | Ishibashi et al. |
| 4,309,712 | A | 1/1982 | Iwakura |
| 4,347,518 | A | 8/1982 | Williams et al. |
| 4,364,063 | A | 12/1982 | Anno et al. |
| 4,385,302 | A | 5/1983 | Moriguchi et al. |
| 4,391,535 | A | 7/1983 | Palmer |

(Continued)

FOREIGN PATENT DOCUMENTS

EP 0 204 094 4/1986

(Continued)

OTHER PUBLICATIONS

Bhukhanwala et al., "Automated Global Enhancement of Digitalized Photographs," IEEE Transactions on Consumer Electronics, Feb. 1994.

(Continued)

*Primary Examiner* — Thomas D Lee
(74) *Attorney, Agent, or Firm* — Woodcock Washburn LLP

(57) ABSTRACT

An adaptive halftoning method where the difference between a digital image and a filtered digital image is introduced into the system on a pixel by pixel basis is disclosed. In this method, each input difference pixel has a corresponding error value of the previous pixel added to the input value at a summing node, resulting in modified image difference data; the modified image difference data is passed to a threshold comparator where the modified image difference data is compared to a threshold value, the threshold value varying according to the properties of the digital image, to determine the appropriate output level; the output level is subtracted from the modified image difference value to produce the input to an error filter; the output of the error filter is multiplied by an adaptation coefficient, where the adaptation coefficient varies according to the properties of the digital image, to generate the error level for the subsequent input pixel; and, the cyclical processing of pixels is continued until the end of the input data is reached.

33 Claims, 5 Drawing Sheets

U.S. PATENT DOCUMENTS

| | | | | |
|---|---|---|---|---|
| 4,415,908 | A | 11/1983 | Sugiura | |
| 4,443,121 | A | 4/1984 | Arai | |
| 4,447,818 | A | 5/1984 | Kurata et al. | |
| 4,464,669 | A | 8/1984 | Sekiya et al. | |
| 4,514,738 | A | 4/1985 | Nagato et al. | |
| 4,524,368 | A | 6/1985 | Inui et al. | |
| 4,540,992 | A | 9/1985 | Moteki et al. | |
| 4,563,691 | A | 1/1986 | Noguchi et al. | |
| 4,607,262 | A | 8/1986 | Moriguchi et al. | |
| 4,638,372 | A | 1/1987 | Leng et al. | |
| 4,686,549 | A | 8/1987 | Williams et al. | |
| 4,688,051 | A | 8/1987 | Kawakami et al. | |
| 4,704,620 | A | 11/1987 | Ichihashi et al. | |
| 4,738,526 | A | 4/1988 | Larish | |
| 4,739,344 | A | 4/1988 | Sullivan et al. | |
| 4,777,496 | A | 10/1988 | Maejima et al. | |
| 4,805,033 | A | 2/1989 | Nishikawa | |
| 4,809,063 | A | 2/1989 | Moriguchi et al. | |
| 4,884,080 | A | 11/1989 | Hirahara et al. | |
| 4,907,014 | A | 3/1990 | Tzeng et al. | |
| 4,933,709 | A | 6/1990 | Manico et al. | |
| 4,962,403 | A | 10/1990 | Goodwin et al. | |
| 5,006,866 | A | 4/1991 | Someya | |
| 5,045,952 | A | 9/1991 | Eschbach | 358/447 |
| 5,046,118 | A | 9/1991 | Ajewole et al. | |
| 5,066,961 | A | 11/1991 | Yamashita | |
| 5,086,306 | A | 2/1992 | Sasaki | |
| 5,086,484 | A | 2/1992 | Katayama et al. | 382/270 |
| 5,109,235 | A | 4/1992 | Sasaki | |
| 5,115,252 | A | 5/1992 | Sasaki | |
| 5,130,821 | A | 7/1992 | Ng | |
| 5,132,703 | A | 7/1992 | Nakayama | |
| 5,132,709 | A | 7/1992 | West | |
| 5,162,813 | A | 11/1992 | Kuroiwa et al. | |
| 5,184,150 | A | 2/1993 | Sugimoto | |
| 5,208,684 | A | 5/1993 | Itoh | 358/3.03 |
| 5,244,861 | A | 9/1993 | Campbell et al. | |
| 5,248,995 | A | 9/1993 | Izumi | |
| 5,268,706 | A | 12/1993 | Sakamoto | |
| 5,285,220 | A | 2/1994 | Suzuki et al. | |
| 5,307,425 | A | 4/1994 | Otsuka | 382/50 |
| 5,323,245 | A | 6/1994 | Rylander | |
| 5,333,246 | A | 7/1994 | Nagasaka | |
| 5,422,662 | A | 6/1995 | Fukushima et al. | |
| 5,450,099 | A | 9/1995 | Stephenson et al. | |
| 5,455,685 | A | 10/1995 | Mori | |
| 5,469,203 | A | 11/1995 | Hauschild | |
| 5,479,263 | A | 12/1995 | Jacobs et al. | |
| 5,497,174 | A | 3/1996 | Stephany et al. | |
| 5,521,626 | A | 5/1996 | Tanaka et al. | |
| 5,539,443 | A | 7/1996 | Mushika et al. | |
| 5,569,347 | A | 10/1996 | Obata et al. | |
| 5,576,745 | A | 11/1996 | Matsubara | |
| 5,602,653 | A | 2/1997 | Curry | |
| 5,617,223 | A | 4/1997 | Burns et al. | 358/527 |
| 5,623,297 | A | 4/1997 | Austin et al. | |
| 5,623,581 | A | 4/1997 | Attenberg | |
| 5,625,399 | A | 4/1997 | Wiklof et al. | |
| 5,642,148 | A | 6/1997 | Fukushima et al. | |
| 5,644,351 | A | 7/1997 | Matsumoto et al. | |
| 5,646,672 | A | 7/1997 | Fukushima | |
| 5,664,253 | A | 9/1997 | Meyers | |
| 5,668,638 | A | 9/1997 | Knox | 358/298 |
| 5,694,484 | A | 12/1997 | Cottrell et al. | |
| 5,703,644 | A | 12/1997 | Mori et al. | |
| 5,706,044 | A | 1/1998 | Fukushima | |
| 5,707,082 | A | 1/1998 | Murphy | |
| 5,711,620 | A | 1/1998 | Sasaki et al. | |
| 5,719,615 | A | 2/1998 | Hashiguchi et al. | |
| 5,721,578 | A | 2/1998 | Nakai et al. | |
| 5,724,456 | A | 3/1998 | Boyack et al. | |
| 5,729,274 | A | 3/1998 | Sato | |
| 5,757,976 | A | 5/1998 | Shu | 382/252 |
| 5,777,599 | A | 7/1998 | Poduska, Jr. | |
| 5,781,315 | A | 7/1998 | Yamaguchi | |
| 5,784,092 | A | 7/1998 | Fukuoka | |
| 5,786,837 | A | 7/1998 | Kaerts et al. | |
| 5,786,900 | A | 7/1998 | Sawano | |
| 5,800,075 | A | 9/1998 | Katsuma et al. | |
| 5,808,653 | A | 9/1998 | Matsumoto et al. | |
| 5,809,164 | A | 9/1998 | Hultgren, III | |
| 5,809,177 | A | 9/1998 | Metcalfe et al. | 382/251 |
| 5,818,474 | A | 10/1998 | Takahashi et al. | |
| 5,818,975 | A | 10/1998 | Goodwin et al. | |
| 5,835,244 | A | 11/1998 | Bestmann | |
| 5,835,627 | A | 11/1998 | Higgins et al. | |
| 5,841,461 | A | 11/1998 | Katsuma | |
| 5,859,711 | A | 1/1999 | Barry et al. | |
| 5,870,505 | A | 2/1999 | Wober et al. | |
| 5,880,777 | A | 3/1999 | Savoye et al. | |
| 5,889,546 | A | 3/1999 | Fukuoka | |
| 5,897,254 | A | 4/1999 | Tanaka et al. | |
| 5,913,019 | A | 6/1999 | Attenberg | |
| 5,956,067 | A | 9/1999 | Isono et al. | |
| 5,956,421 | A | 9/1999 | Tanaka et al. | |
| 5,970,224 | A | 10/1999 | Salgado et al. | |
| 5,978,106 | A | 11/1999 | Hayashi | |
| 5,995,654 | A | 11/1999 | Buhr et al. | |
| 5,999,204 | A | 12/1999 | Kojima | |
| 6,005,596 | A | 12/1999 | Yoshida et al. | |
| 6,028,957 | A | 2/2000 | Katori et al. | |
| 6,069,982 | A | 5/2000 | Reuman | |
| 6,104,421 | A | 8/2000 | Iga et al. | |
| 6,104,468 | A | 8/2000 | Bryniarski et al. | |
| 6,104,502 | A | 8/2000 | Shiomi | |
| 6,106,173 | A | 8/2000 | Suzuki et al. | |
| 6,108,105 | A | 8/2000 | Takeuchi et al. | |
| 6,128,099 | A | 10/2000 | Delabastita | |
| 6,128,415 | A | 10/2000 | Hultgren, III et al. | |
| 6,133,983 | A | 10/2000 | Wheeler | |
| 6,157,459 | A | 12/2000 | Shiota et al. | |
| 6,172,768 | B1 | 1/2001 | Yamada et al. | |
| 6,186,683 | B1 | 2/2001 | Shibuki | |
| 6,204,940 | B1 | 3/2001 | Lin et al. | |
| 6,208,429 | B1 | 3/2001 | Anderson | |
| 6,226,021 | B1 | 5/2001 | Kobayashi et al. | |
| 6,233,360 | B1 | 5/2001 | Metcalfe et al. | 382/252 |
| 6,243,133 | B1 | 6/2001 | Spaulding et al. | |
| 6,263,091 | B1 | 7/2001 | Jain et al. | |
| 6,282,317 | B1 | 8/2001 | Luo et al. | |
| 6,293,651 | B1 | 9/2001 | Sawano | |
| 6,402,283 | B2 | 6/2002 | Schulte | |
| 6,425,699 | B1 | 7/2002 | Doval | |
| 6,447,186 | B1 | 9/2002 | Oguchi et al. | |
| 6,456,388 | B1 | 9/2002 | Inoue et al. | |
| 6,462,835 | B1 | 10/2002 | Loushin et al. | |
| 6,501,566 | B1 | 12/2002 | Ishiguro et al. | 358/3.05 |
| 6,537,410 | B2 | 3/2003 | Arnost et al. | |
| 6,563,945 | B2 | 5/2003 | Holm | |
| 6,567,111 | B2 | 5/2003 | Kojima et al. | |
| 6,577,751 | B2 | 6/2003 | Yamamoto | |
| 6,583,852 | B2 | 6/2003 | Baum et al. | |
| 6,608,926 | B1 | 8/2003 | Suwa | |
| 6,614,459 | B2 | 9/2003 | Fujimoto et al. | |
| 6,628,417 | B1 | 9/2003 | Naito et al. | |
| 6,628,823 | B1 | 9/2003 | Holm | |
| 6,628,826 | B1 | 9/2003 | Gilman et al. | |
| 6,628,899 | B1 | 9/2003 | Kito | |
| 6,650,771 | B1 | 11/2003 | Walker | |
| 6,661,443 | B2 | 12/2003 | Bybell et al. | |
| 6,671,063 | B1 | 12/2003 | Iida | 358/1.15 |
| 6,690,488 | B1 | 2/2004 | Reuman | |
| 6,694,051 | B1 | 2/2004 | Yamazoe et al. | |
| 6,711,285 | B2 | 3/2004 | Noguchi | |
| 6,760,489 | B1 | 7/2004 | Kuwata | |
| 6,762,855 | B1 | 7/2004 | Goldberg et al. | |
| 6,771,832 | B1 | 8/2004 | Naito et al. | |
| 6,819,347 | B2 | 11/2004 | Saquib et al. | |
| 6,826,310 | B2 | 11/2004 | Trifonov et al. | |
| 6,842,186 | B2 | 1/2005 | Bouchard et al. | |
| 6,906,736 | B2 | 6/2005 | Bouchard et al. | |
| 6,937,365 | B2 | 8/2005 | Gorian et al. | |
| 6,956,967 | B2 | 10/2005 | Gindele et al. | |
| 6,999,202 | B2 | 2/2006 | Bybell et al. | |
| 7,050,194 | B1 | 5/2006 | Someno et al. | |
| 7,092,116 | B2 | 8/2006 | Calaway | |
| 7,127,108 | B2 | 10/2006 | Kinjo et al. | |

| | | | |
|---|---|---|---|
| 7,129,980 | B1 | 10/2006 | Ashida |
| 7,154,621 | B2 | 12/2006 | Rodriguez et al. |
| 7,154,630 | B1 | 12/2006 | Nimura et al. |
| 7,167,597 | B2 | 1/2007 | Matsushima |
| 7,200,265 | B2 | 4/2007 | Imai |
| 7,224,476 | B2 | 5/2007 | Yoshida |
| 7,260,637 | B2 | 8/2007 | Kato |
| 7,272,390 | B1 | 9/2007 | Adachi et al. ..... 455/426.1 |
| 7,283,666 | B2 | 10/2007 | Saquib |
| 7,336,775 | B2 | 2/2008 | Tanaka et al. |
| 7,548,260 | B2 | 6/2009 | Yamaguchi |
| 7,557,950 | B2 | 7/2009 | Hatta et al. |
| 2003/0021478 | A1 | 1/2003 | Yoshida |
| 2003/0038963 | A1 | 2/2003 | Yamaguchi ..... 358/1.15 |
| 2004/0073783 | A1 | 4/2004 | Ritchie |
| 2004/0179226 | A1 | 9/2004 | Burkes et al. |
| 2004/0207712 | A1 | 10/2004 | Bouchard et al. |
| 2005/0005061 | A1 | 1/2005 | Robins |
| 2005/0219344 | A1 | 10/2005 | Bouchard |
| 2007/0036457 | A1 | 2/2007 | Saquib |
| 2008/0017026 | A1 | 1/2008 | Dondlinger |
| 2009/0128613 | A1 | 5/2009 | Bouchard et al. |

FOREIGN PATENT DOCUMENTS

| | | | |
|---|---|---|---|
| EP | 0 454 495 | | 10/1991 |
| EP | 0 454 495 | A1 | 10/1991 |
| EP | 0 619 188 | | 10/1994 |
| EP | 0 625 425 | | 11/1994 |
| EP | 0 626 611 | | 11/1994 |
| EP | 0 791 472 | | 2/1997 |
| EP | 0 762 736 | | 3/1997 |
| EP | 0 773 470 | | 5/1997 |
| EP | 0 939 359 | | 9/1999 |
| EP | 1 004 442 | | 5/2000 |
| EP | 1 056 272 | | 11/2000 |
| EP | 1 078 750 | | 2/2001 |
| EP | 1 137 247 | | 9/2001 |
| EP | 1 201 449 | | 10/2001 |
| EP | 1 392 514 | | 9/2005 |
| EP | 0 933 679 | | 4/2008 |
| EP | 1 393 544 | | 2/2010 |
| GB | 2 356 375 | | 5/2001 |
| JP | 58-164368 | | 9/1983 |
| JP | 59-127781 | | 7/1984 |
| JP | 63-209370 | A | 8/1988 |
| JP | 01 040371 | | 2/1989 |
| JP | 02-248264 | | 10/1990 |
| JP | 02-289368 | | 11/1990 |
| JP | 03-024972 | | 2/1991 |
| JP | 03-222588 | | 10/1991 |
| JP | 04-008063 | | 1/1992 |
| JP | 4-119338 | | 4/1992 |
| JP | 05-136998 | | 6/1993 |
| JP | 06 183033 | | 7/1994 |
| JP | 06 266514 | | 9/1994 |
| JP | 06-292005 | A | 10/1994 |
| JP | 6-308632 | | 11/1994 |
| JP | 06-350888 | A | 12/1994 |
| JP | 08-3076999 | A | 11/1996 |
| JP | 9-138465 | | 5/1997 |
| JP | 09 167129 | | 6/1997 |
| JP | 10-285390 | | 10/1998 |
| JP | 11-055515 | A | 2/1999 |
| JP | 11 505357 | A | 5/1999 |
| JP | 11-275359 | A | 10/1999 |
| JP | 2000-050077 | | 2/2000 |
| JP | 2000-050080 | | 2/2000 |
| JP | 2000-184270 | | 6/2000 |
| JP | 2001-160908 | | 6/2001 |
| JP | 2001-273112 | | 10/2001 |
| JP | 2002 199221 | A | 7/2002 |
| JP | 2002 247361 | A | 8/2002 |
| JP | 2003-008986 | | 1/2003 |
| KR | 2001-0037684 | | 5/2001 |
| WO | WO 9734257 | A1 | 9/1997 |
| WO | WO 99 53415 | | 10/1999 |
| WO | WO 00/04492 | | 1/2000 |
| WO | WO 01/01669 | | 1/2001 |
| WO | WO 01/031432 | | 5/2001 |
| WO | WO 02/078320 | | 10/2002 |
| WO | WO 02/096651 | | 12/2002 |
| WO | WO 02/098124 | | 12/2002 |
| WO | WO 03/071780 | | 8/2003 |
| WO | WO 04/077816 | | 9/2004 |
| WO | WO 05 006200 | | 1/2005 |

OTHER PUBLICATIONS

Hann, R.A. et al., "Chemical Technology in Printing and Imaging Systems", *The Royal Society of Chemistry, Special Publication.* 133 (1993), pp. 73-85.

Hann, R.A. et al., "Dye Diffusion Thermal Transfer (D2T2) Color Printing", *Journal of Imaging Technology.,* 16 (6). (1990), pp. 238-241.

Kearns et al., "Algorithmic Stability and Sanity-Check Bounds for Leave-One-Out Cross-Validation," XP-002299710, Jan. 1997, 1-20.

Taguchi et al., "New Thermal Offset Printing Employing Dye Transfer Technology (Tandem TOP-D)," *NIP17: International Conference on Digital Printing Technologies,* Sep. 2001, vol. 17, pp. 499-503.

Weston et al., "Adaptive Margin Support Vector Machines," Advances in Large Margin Classifiers, 2000, 281-296.

United States Patent and Trademark Office: Restriction Requirement dated Sep. 30, 2003, U.S. Appl. No. 10/078,644, filed Feb. 19, 2002.

United States Patent and Trademark Office: Restriction Requirement dated Oct. 2, 2003, U.S. Appl. No. 10/080,883, filed Feb. 2, 2002.

United States Patent and Trademark Office: Non-Final Office Action dated Oct. 2, 2004, U.S. Appl. No. 10/080,833, filed Feb. 22, 2003.

United States Patent and Trademark Office: Non-Final Office Action dated Sep. 22, 2003, U.S. Appl. No. 10/078,644, filed Feb. 19, 2002.

United States Patent and Trademark Office: Notice of Allowance dated Sep. 23, 2004, U.S. Appl. No. 10/080,883, filed Feb. 22, 2003.

United States Patent and Trademark Office: Non-Final Office Action dated Nov. 29, 2004, U.S. Appl. No. 09/817,932, filed Mar. 27, 2001.

United States Patent and Trademark Office: Non-Final Office Action dated Nov. 29, 2004, U.S. Appl. No. 09/870,537, filed May 30, 2001.

United States Patent and Trademark Office: Notice of Allowance dated Feb. 22, 2005, U.S. Appl. No. 10/078,644, filed Feb. 19, 2002.

United States Patent and Trademark Office: Notice of Allowance dated May 9, 2005, U.S. Appl. No. 09/870,537, filed May 30, 2001.

United States Patent and Trademark Office: Notice of Allowance dated Aug. 31, 2005, U.S. Appl. No. 09/817,932, filed Mar. 27, 2001.

United States Patent and Trademark Office: Non-Final Office Action dated Jul. 13, 2006, U.S. Appl. No. 10/375,440, filed Feb. 27, 2003.

United States Patent and Trademark Office: Final Office Action dated Dec. 4, 2006, U.S. Appl. No. 10/375,440, filed Feb. 27, 2003.

United States Patent and Trademark Office: Notice of Allowance dated May 29, 2007, U.S. Appl. No. 10/375,440, filed Feb. 27, 2003.

United States Patent and Trademark Office: Restriction Requirement dated Jun. 29, 2007, U.S. Appl. No. 10/611,737, filed Jul. 1, 2003.

United States Patent and Trademark Office: Restriction Requirement dated Sep. 4, 2007, U.S. Appl. No. 10/844,286, filed May 12, 2004.

United States Patent and Trademark Office: Notice of Allowance dated Sep. 6, 2007, U.S. Appl. No. 10/375,440, filed Feb. 27, 2003.

United States Patent and Trademark Office: Non-Final Office Action dated Oct. 4, 2007, U.S. Appl. No. 10/611,737, filed Jul. 1, 2003.

United States Patent and Trademark Office: Non-Final Office Action dated Nov. 14, 2007, U.S. Appl. No. 10/844,286, filed May 12, 2004.

United States Patent and Trademark Office: Non-Final Office Action dated Mar. 20, 2008, U.S. Appl. No. 10/844,286, filed May 12, 2005.

United States Patent and Trademark Office: Non-Final Office Action dated Jun. 18, 2008, U.S. Appl. No. 10/611,737, filed Jul. 1, 2003.

United States Patent and Trademark Office: Final Office Action dated Sep. 12, 2008, U.S. Appl. No. 10/844,286, filed May 12, 2004.

United States Patent and Trademark Office: Restriction Requirement dated Oct. 8, 2008, U.S. Appl. No. 11/546,633, filed Oct. 12, 2006.

United States Patent and Trademark Office: Final Office Action dated Jan. 28, 2009, U.S. Appl. No. 10/611,737, filed Jul. 1, 2003.

United States Patent and Trademark Office: Non-Final Office Action dated Jan. 30, 2009, U.S. Appl. No. 11/546,633, filed Oct. 12, 2006.

United States Patent and Trademark Office: Non-Final Office Action dated May 21, 2009, U.S. Appl. No. 10/844,286, filed May 12, 2004.

United States Patent and Trademark Office: Restriction Requirement dated May 26, 2009, U.S. Appl. No. 11/546,633, filed Oct. 12, 2006.
United States Patent and Trademark Office: Non-Final Office Action dated Jun. 10, 2009, U.S. Appl. No. 10/611,737, filed Jul. 1, 2003.
United States Patent and Trademark Office: Final Office Action dated Jul. 9, 2009, U.S. Appl. No. 11/546,633, filed Oct. 12, 2006.
United States Patent and Trademark Office: Non-Final Office Action dated Jul. 31, 2009, U.S. Appl. No. 12/031,151, filed Feb. 14, 2008.
United States Patent and Trademark Office: U.S. Appl. No. 12/031,151, filed Feb. 14, 2008, Bybell.
International Preliminary Examination Report (IPER) dated Jun. 30, 2003, PCT/US02/015546.
EP Communication issued by the Examining Division Apr. 2, 2004, EP1392514.
International Preliminary Examination Report (IPER) issued Sep. 2, 2005, PCT/US04/004964.
EP Communication issued by the Examining Division Jan. 11, 2006, EP1597911.
EP Communication issued by the Examining Division May 23, 2006, EP1597911.
International Preliminary Examination Report (IPER) issued Jan. 3, 2006, PCT/US04/020981.
International Preliminary Examination Report (IPER) dated Sep. 17, 2003, PCT/US02/015913.
EP Communication issued by the Examining Division May 29, 2009, EP1479220.
International Preliminary Examination Report (IPER) dated Jan. 29, 2003, PCT/US02/008954.
EP Communication issued by the Examining Division Jul. 7, 2009, EP1374557.
EPC Application No. 1597911: Communication issued by the Examining Division dated May 26, 2010, 8 pages.
EPC Application No. 1393544: Communication issued by the Examining Division dated Jan. 15, 2009, 7 pages.
International Application No. PCT/US02/015913: International Search Report mailed Oct. 11, 2002, 2 pages.
International Application No. PCT/US02/018528: International Search Report mailed Oct. 31, 2002, 3 pages.
International Application No. PCT/US02/18528: International Preliminary Examination Report (IPER) dated Apr. 4, 2003, 2 pages.
International Application No. PCT/US04/020981: International Search Report mailed Mar. 15, 2005, 6 pages.
Japanese Application No. 2003-501190: Notice of Reasons of Rejection dated Dec. 15, 2006, 5 pages.
Japanese Application No. 2008-096460: Notice of Reasons of Rejection dated Jul. 30, 2010, 4 pages.
Japanese Application No. 2008-213280: Notice of Reasons of Rejection dated Feb. 5, 2010, 6 pages.
Ulichney, R., "Digital Halftoning," MIT Press, 1987, 239-319 p. 341.
Pratt, W.K., "Digital Image Processing," Wiley & Sons, 1978, 311-318.
Gonzalez et al., "Digital Image Processing," Addison-Wesley, 1977, 119-126.
Wong, P.W., "Adaptive Error Diffusion and Its Application in Multiresolution Rendering," IEEE Trans. On Image Processing, 1996, 5(7), 1184-1196.
Damera-Venkata et al., "Adaptive Threshold Modulation for Error Diffusion Halftoning," IEEE Trans. On Image Processing, 2001, 10(1), 104-116.
Know et al., "Threshold Modulation In Error Diffusion," SPIE, 1993, 2(3), 185-192.
"Digital Halftoning", R. Ulichney, pp. 239-319, pp. 341, 1987, Cambridge, MA, MIT Press.
"Digital Image Processing", W.K. Pratt, pp. 311-318, 1978, New York, NY, J. Wiley & Sons.
"Digital Image Processing", R. C. Gonzalez and P. Wintz, pp. 119-126, 1977, Reading, MA, Addison-Wesley.
"Adaptive Error Diffusion And Its Application In Multiresolution Rendenring", P. W. Wong, pp. 1184-1196, Jul. 1996, IEEE Trans. On Image Processing, vol. 5, No. 7, IEEE.
"Adaptive Threshold Modulation For Error Diffusion Halftoning", N. Damera-Venkata and B. L. Evans, pp. 104-116, Jan. 2001, IEEE Trans. On Image Processing, vol. 10, No. 1, IEEE.
"Threshold Modulation In Error Diffusion", K. T. Know and R. Eschbach,pp. 185-192, Jul. 1993, vol. 2, No. 3, SPIE.

RENDERING IMAGES UTILIZING ADAPTIVE ERROR DIFFUSION

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to the rendering of digital image data, and in particular, to the binary or multilevel representation of images for printing or display purposes 2. Background Description Since images constitute an effective means of communicating information, displaying images should be as convenient as displaying text. However, many display devices, such as laser and ink jet printers, print only in a binary fashion. Furthermore, some image format standards only allow binary images. For example, the WAP1.1 (Wireless Application Protocol) protocol specification allows only for one graphic format, WBMP, a one (1) bit version of the BMP (bitmap) format. Besides allowing only binary images, some image format standards and some displays only allow images of a limited number of pixels. In the WAP 1.1 standard, a WBMP image should not be larger than 150×150 pixels. Some WAP devices have screens that are very limited in terms of the number of pixels. For example, one WAP device has a screen that is 96 pixels wide by 65 pixels high. In order to render a digitized continuous tone input image using a binary output device, the image has to be converted to a binary image.

The process of converting a digitized continuous tone input image to a binary image so that the binary image appears to be a continuous tone image is known as digital halftoning.

In one type of digital halftoning processes, ordered dither digital halftoning, the input digitized continuous tone image is compared, on a pixel by pixel basis, to a threshold taken from a threshold array. Many ordered dither digital halftoning methods suffer from low frequency artifacts. Because the human vision system has greater sensitivity at low frequencies (less than 12 cycles/degree), such low frequency artifacts are very noticeable.

The visibility of low frequency artifacts in ordered dither digital halftoning methods has led to the development of methods producing binary images with a power spectrum having mostly higher frequency content, the so called "blue noise methods".

The most frequently used "blue noise method" is the error diffusion method. In an error diffusion halftoning system, an input digital image $I_n$ (the digitized continuous tone input image) is introduced into the system on a pixel by pixel basis, where n represents the input image pixel number. Each input pixel has its corresponding error value $E_{n-1}$, where $E_{n-1}$ is the error value of the previous pixel (n−1), added to the input value $I_n$ at a summing node, resulting in modified image data. The modified image data, the sum of the input value and the error value of the previous pixel ($I_n+E_{n-1}$), is passed to a threshold comparator. The modified image data is compared to the constant threshold value $T_{.O}$, to determine the appropriate output level $O_n$. Once the output level $O_n$ is determined, it is subtracted from the modified image value to produce the input to an error filter. The error filter allocates its input, $I_n-O_n$, to subsequent pixels based upon an appropriate weighting scheme. Various weighting techniques may be used generate the error level $E_{.n}$ for the subsequent input pixel. The cyclical processing of pixels is continued until the end of the input data is reached. (For a more complete description of error diffusion see, for example, "Digital Halftoning", by Robert Ulichney, MIT Press, Cambridge, Mass. and London, England, 1990, pp. 239-319).

Although the error diffusion method presents an improvement over many ordered dither methods, artifacts are still present. There is an inherent edge enhancement in the error diffusion method. Other known artifacts produced by the error diffusion method include artifacts called "worms" and "snowplowing" which degrade image quality.

In U.S. Pat. No. 5,045,952, Eschbach disclosed selectively modifying the threshold level on a pixel by pixel basis in order to increase or decrease the edge enhancement of the output digital image. The improvements disclosed by Eschbach do not allow the control of the edge enhancement by controlling the high frequency portion of the error. Also, the improvements disclosed by Eschbach do not introduce parameters that can be selected to produce the image of the highest perceptual quality at a specific output device.

In U.S. Pat. No. 5,757,976, Shu disclosed utilizing a set of error filters having different sizes for diffusing the input of the error filter among neighboring pixels in predetermined tonal areas of an image and adding "noise" to the threshold in order to achieve a smooth halftone image quality. The improvements disclosed by Shu do not introduce parameters that can be selected to produce the image of the highest perceptual quality at a specific output device.

SUMMARY OF THE INVENTION

It is the primary object of this invention to provide a method for generating a halftone image from a digitized continuous tone input image that provides adjustment of the local contrast of the resulting halftone image, minimizes artifacts and is easily implemented.

It is also an object of this invention to provide a method for generating a halftone image with parameters that can be selected to produce the image of highest quality at a specific output device.

To achieve the objects of this invention, one aspect of this invention includes an adaptive halftoning method where the difference between a digital image and a filtered digital image is introduced into the system on a pixel by pixel basis; each input difference pixel having a corresponding error value, generated from the previous pixels, added to the input value at a summing node, resulting in modified image difference data; the modified image difference data being passed to a threshold comparator where the modified image difference data is compared to a threshold value, the threshold value varying according to the properties of the digital image, to determine the appropriate output level; the output level is subtracted from the modified image difference value to produce the input to an error filter; the output of the error filter is multiplied by a adaptation coefficient, where the adaptation coefficient varies according to the properties of the digital image, to generate the error level for the subsequent input pixel; and, the cyclical processing of pixels is continued until the end of the input data is reached.

In another aspect of this invention, in the method described above, a histogram modification is performed on the image, and the difference between the histogram modified digital image and the filtered digital image is introduced into the system on a pixel by pixel basis.

In still another aspect of this invention, in the method described above, the histogram modification is performed on the difference between the digital image and the filtered digital image and the histogram modified difference is introduced into the system on a pixel by pixel basis.

In a further aspect of this invention, in the method described above, the selectively changing of the adaptation coefficient comprises dividing the difference between the value at the pixel and the filtered value at the pixel by the filtered value at the pixel, multiplying the absolute value of the result of the division by a first parameter, and adding a second parameter to the result of the multiplication, thereby obtaining the coefficient.

In still another aspect of this invention, in the method described above, the threshold calculation comprises multiplying the filtered value at the pixel by a third parameter.

In still another aspect of this invention, in the method described above and including the adaptation coefficient and threshold calculated as in the two preceding paragraphs, where the filter is a filter of finite extent, the extent of the filter, the first, second parameters and third parameters are selected to produce the image of the highest perceptual quality at a specific output device.

The methods, systems and computer readable code of this invention can be used to generate halftone images in order to obtain images of the highest perceptual quality when rendered on displays and printers. The methods, systems and computer readable code of this invention can also be used to for the design of computer generated holograms and for the encoding of the continuous tone input data.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

DETAILED DESCRIPTION

A method and system, for generating a halftone image from a digitized continuous tone input image, that provide adjustment of the local contrast of the resulting halftone image, minimizes artifacts, are easily implemented and contain parameters that can be selected on the basis of device characteristics like brightness, dynamic range, and pixel count, to produce the image of highest perceptual quality at a specific output device are disclosed.

Figure 1A:
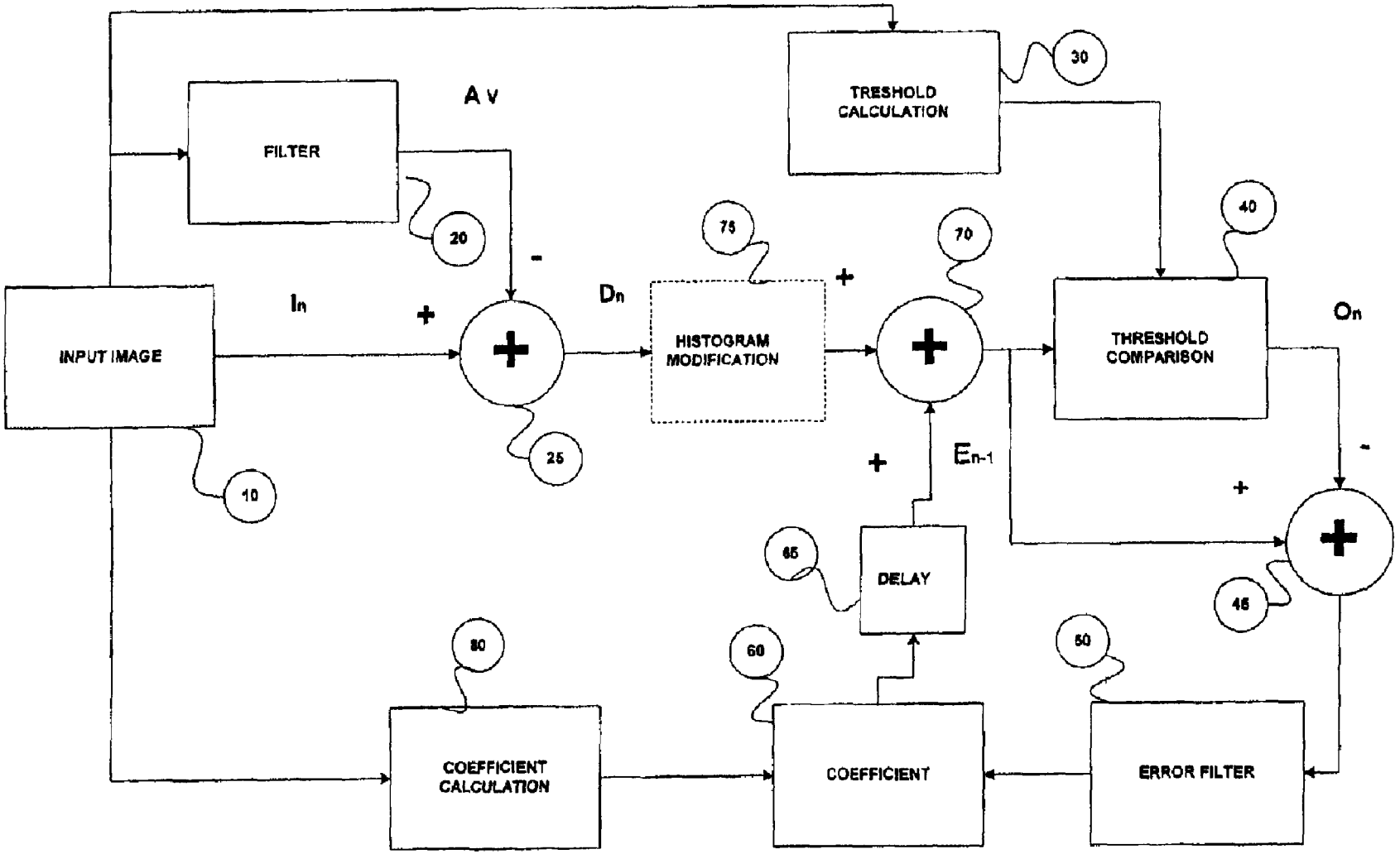
FIG. 1a depicts a block diagram of selected components of an embodiment of a system, of this invention for generating a halftone image from a digitized continuous tone input image, where the histogram modification block is included after the summing node; and, FIG. 1b depicts a block diagram of selected components of an embodiment of a system of this invention for generating a halftone image from a digitized continuous tone input image, where the histogram modification block is included before the summing node; and, FIG. 1c depicts a block diagram of selected components of an embodiment of a system of this invention for generating a halftone image from a digitized continuous tone input image, where the adaptation coefficient multiplies the input to the error filter block.

A block diagram of selected components of an embodiment of a system of this invention for generating a halftone image from a digitized continuous tone input image (also referred to as a digital image) is shown in FIG. 1a. Referring to FIG. 1a, image input block 10 introduces an input digital image $I_n$ into the system on a pixel by pixel basis, where n represents the input image pixel number. The input image is also provided to the filtering block 20. The output of filtering block 20 has the form $$Av_n 32\ h(\ldots, I_k, \ldots, I_n, \ldots) \quad (1)$$

where h is a functional form spanning a number of pixels. It should be apparent that the input digital image 10 can be a two dimensional array of pixel values and that the array can be represented as a linear array by using such approaches as raster representations or serpentine representation. For a two dimensional array of pixel values, the filter 20 will also be a two dimensional array of filter coefficients and can also be represented as a linear array. The functional forms will be shown in the one dimensional form for ease of interpretation.

In one embodiment: the output of the filtering block 20 has the form $$Av_n = \{\Sigma_{n-N}^{n+N} I_j\}/(2N+1) \quad (2)$$

If the filtering block 20 comprises a linear filter, $Av_n$ will be given by a sum of terms, each term comprising the product of an input image pixel value multiplied by a filter coefficient.

It should be apparent that special consideration has to be given to the pixels at the boundaries of the image. For example, the calculations can be started N pixels from the boundary in equation (2). In that case the calculated and halftone image are smaller than the input image. In another case, the image is continued at the boundaries, the continuation pixels having the same value as the boundary pixel. It should be apparent that other methods of taking into account the effect of the boundaries can be used.

The output of the filtering block 20, $Av_n$, is subtracted from the input digital image $I_n$ at node 25, resulting in a difference value, $D_n$. In the embodiment in which histogram modification is not included, $D_n$ is the input to a summing node 70. At the summing node 70, a corresponding error value $E_{n-1}$, where $E_{n-1}$ is the error value accumulated from the previous pixels, is added to the input value $D_n$ resulting in a modified image datum. The modified image data, $D_n+E_{n-1}$, is compared to the output of the threshold calculation block 30 in the threshold comparison block 40 to produce the halftoning output, $O_n$. (In the case of a binary output device, if the modified image datum is above the threshold, the output level is the white level. Otherwise, the output level is the black level.) Once the output level $O_n$ is determined, it is subtracted from the modified image value to produce the input to an error filter block 50. The error filter block 50 allocates its input, $D_n+E_{n-1}-O_n$, to subsequent pixels based upon an appropriate weighting scheme. The weighted contributions of the error filter block 50 input are stored and all the contributions to the next input pixel are summed to produce the output of the error filter block 50, the error value. The output of the error filter block 50, the error value, is multiplied by the adaptation coefficient in block 60 to generate the error level $E_n$ for the subsequent input pixel. The cyclical processing of pixels, as further described below, is continued until the end of the input data is reached.

Figure 1B:
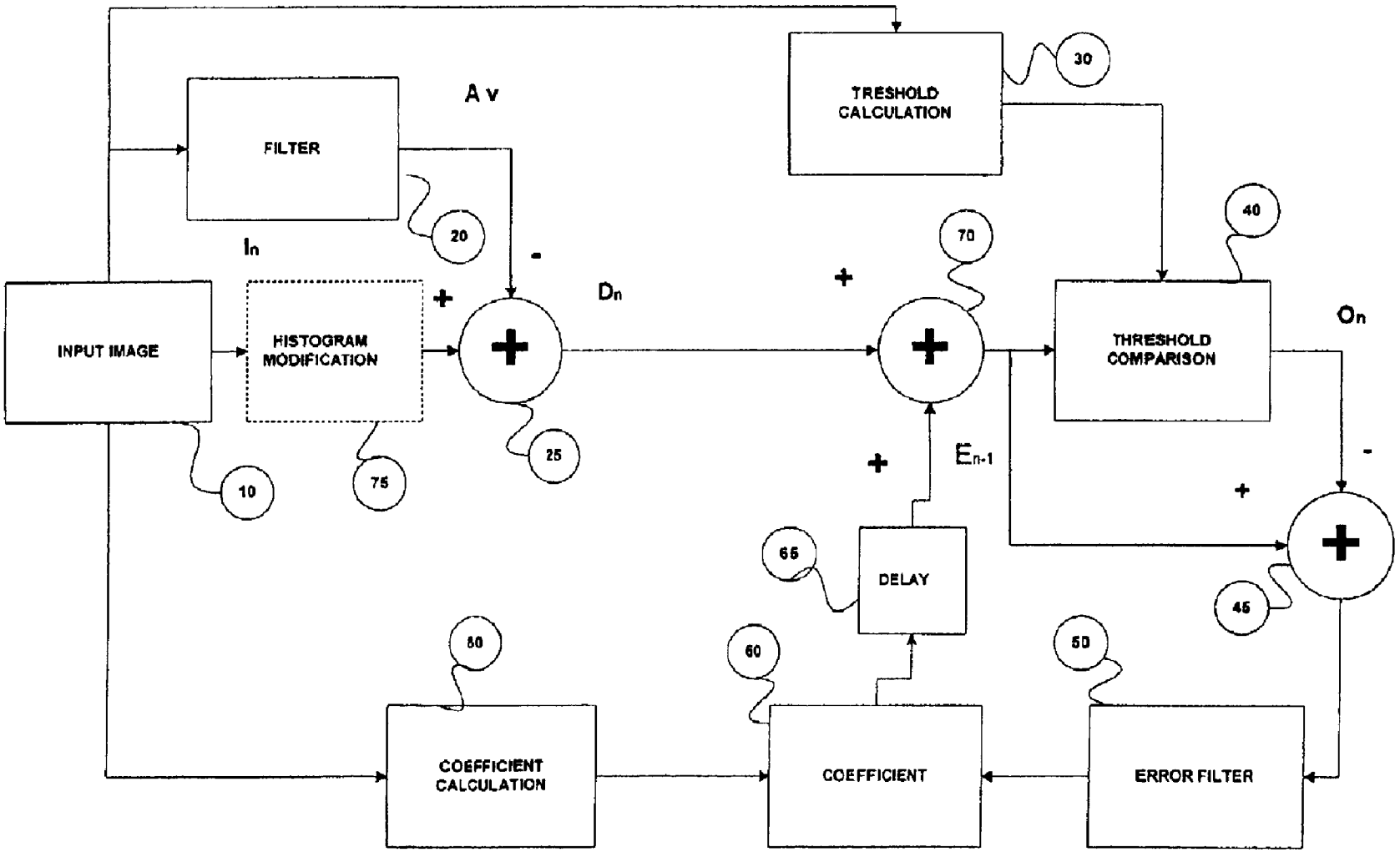
Figure 1C:
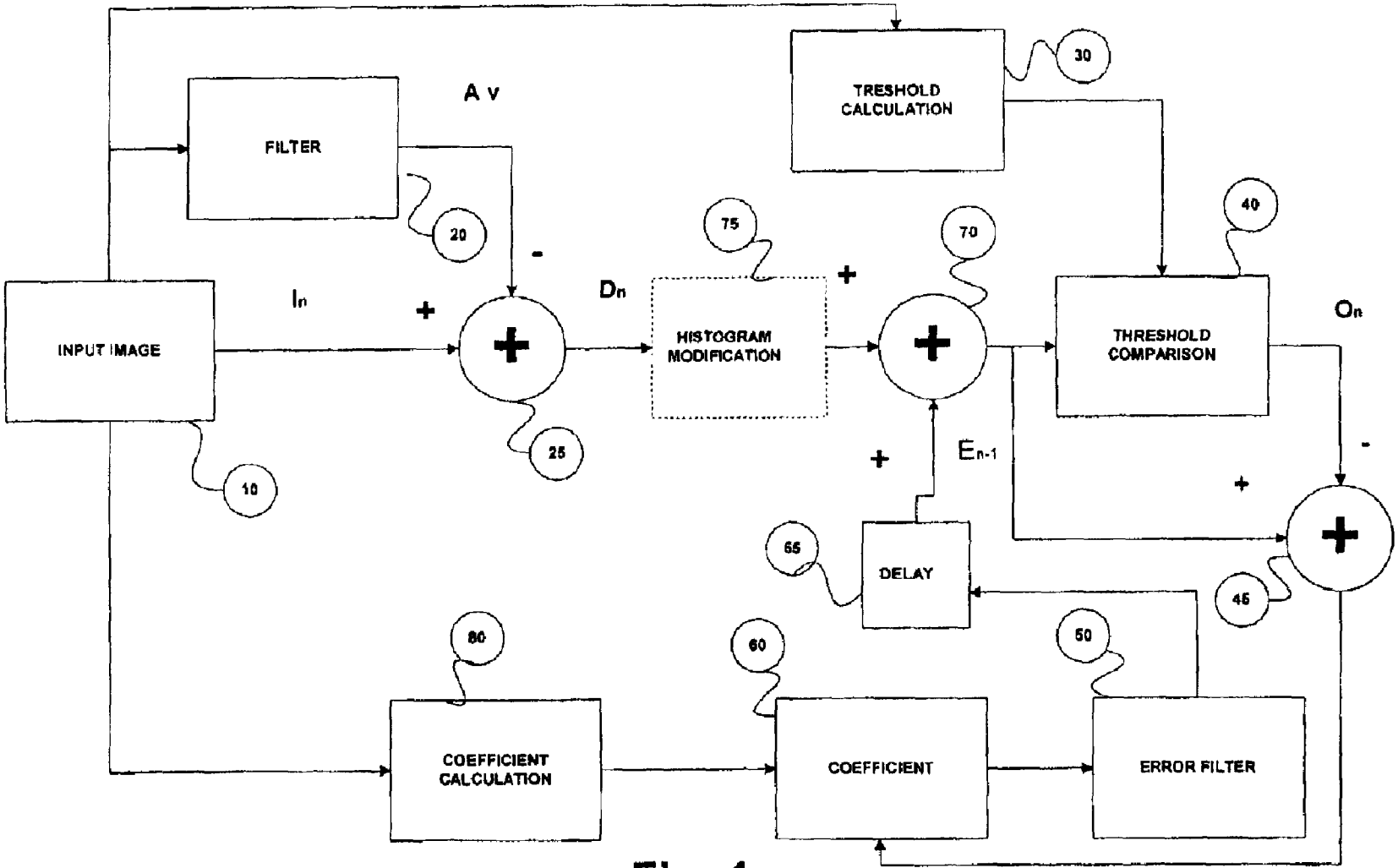

Referring again to FIG. 1, the input image is also provided to the threshold calculation block 30. The output of the threshold calculation block 30 has the form $$t(\ldots, I_k, \ldots, I_n, \ldots) \quad (3)$$

where t is a functional form spanning a number of pixels. The form in equation (3) allows the varying of the threshold according to properties of the digital image.

In one embodiment, $$t(\ldots, I_k, \ldots, I_n, \ldots) = C_0\{\Sigma_{n-N}^{n+N} I_j\}/(2N+1) \quad (4)$$

In another embodiment, the output of the threshold calculation block is a linear combination of terms, each term comprising the product of an input image pixel value multiplied by a coefficient. It should be apparent that this embodiment can also be expressed as a function times a parameter.

The output of the threshold calculation block 30 is the threshold.

The first pixel value to be processed, $I_O$, produces a difference value $D_O$ from summing node 25 and produces a value of $D_O$ out of summing node 70 (since $E_{-1}$ is equal to 0). $D_O$ is then compared to the threshold producing an output of $O_O$. At summing node 45, $O_O$ is subtracted from $D_O$ to produce the input to the error filter 50. The error filter 50 allocates its input, $D_O - O_O$, to subsequent pixels based upon an appropriate weighting scheme which determines how much the current input contributes to each subsequent pixel. Various weighting techniques may be used (see, for example, "Digital Halftoning" by Robert Ulichney, MIT Press, Cambridge, Mass. and London, England, 1990, pp. 239-319). The output of error filter 50 is multiplied by a adaptation coefficient 60. The adaptation coefficient 60 is the output of the coefficient calculation block 80. In one embodiment, the output of the coefficient calculation block 80 has the form $$C_1 + C_2 \mathrm{abs}\{f(\ldots, I_k, \ldots, I_n, \ldots,)/g(\ldots, I_k, \ldots, I_n, \ldots)\} \quad (5)$$

where f and g are functional forms spanning a number of pixels. The form of Equation (5) allows the selective changing, of the coefficient according to the local properties of the digital image. $C_1$ and $C_2$ and the parameter in the threshold expression can be selected to produce the image of highest perceptual quality at a specific output device.

In another embodiment, the output of the coefficient calculation block 80 has the form $$C_1 + C_2\{\mathrm{abs}((I_n - (\{\Sigma_{n-N}^{n+N} I_j\}/(2N+1)))/(\{\Sigma_{n-N}^{n+N} I_j\}/(2N+1)))\} \quad (6)$$

The input of error filter block 50 is multiplied by weighting coefficients and stored. All the contributions from the stored weighted values to the next pixel are summed to produce the out put of the error filter block 50. The output of the error filter block 50 is multiplied by the adaptation coefficient 60. The delay block 65 stores the result of the product of the adaptation coefficient 60 and the output of the error filter block 50. (In one embodiment, the Floyd-Steinberg filter, the input to the error filter is distributed according to the filter weights to the next pixel in the processing line and to neighboring pixels in the following line.) The output of delay block 65 is $E_{n-1}$ and is delayed by one pixel. (When the first pixel is processed, the output of the delay, $E_O$, is added to the subsequent difference, $D_1$.)

It should be apparent that the sequence order of error filter block 50 and the adaptation coefficient block 60 can be interchanged with similar results. In the embodiment in which the adaptation coefficient 60 multiplies the difference between the modified image datum and the output level, shown in FIG. 1c, the delay block 65 stores the output of the error filter block.

When the next pixel, $I_1$, is introduced into the system from the image input block 10, it produces a difference value $D_1$ from summing node 25 and produce a value of $(D_1 + E_O)$ out of summing node 70.

The above steps repeat for each subsequent pixel in the digital image thereby producing a halftone image, the sequence $O_O, O_1, \ldots, O_n$. The modification of the threshold level and the adaptation coefficient allows control of the amount of edge enhancement and provides the opportunity to reduce artifacts.

In the embodiment in which histogram modification is included after the summing node 25, $D_n$ is the input to the histogram modification block 75 and the output of the histogram modification block 75 is the input to the summing node 70. The above description follows if $D_n$ is replaced by the output of the histogram modification block 75. It should be apparent that histogram modification operates on the entire difference image. (Histogram modification is well known to those skilled in the art. For a discussion of histogram modification, see, for example, Digital Image Processing, by William K. Pratt, John Wiley and Sons, 1978, ISBN 0-471-01888-0, pp. 311-318. For a discussion of histogram equalization, a form of histogram modification, see, for example, Digital Image Processing, by R. C. Gonzalez and P. Wintz, Addison-Wesley Publishing Co., 1977, ISBN 0-201-02596-3, pp. 119-126.)

In the embodiment in which histogram modification is included after the image input block 10, $D_n$ is the difference between the output of the histogram modification block 75 (FIG. 1b) and the filtered image. The above description follows if $I_n$ is replaced by the output of the histogram modification block.

The method described above produces improvements of the error diffusion method by utilizing the difference between the digital image and the filtered digital image as input into the system instead of the digital image, by multiplying the .the output of the error filter by the adaptation coefficient, where the adaptation coefficient varies according to the properties of the digital image, and by using a threshold value that varies according to the properties of the digital image to determine the appropriate output level.

Sample Embodiment

Figure 2:
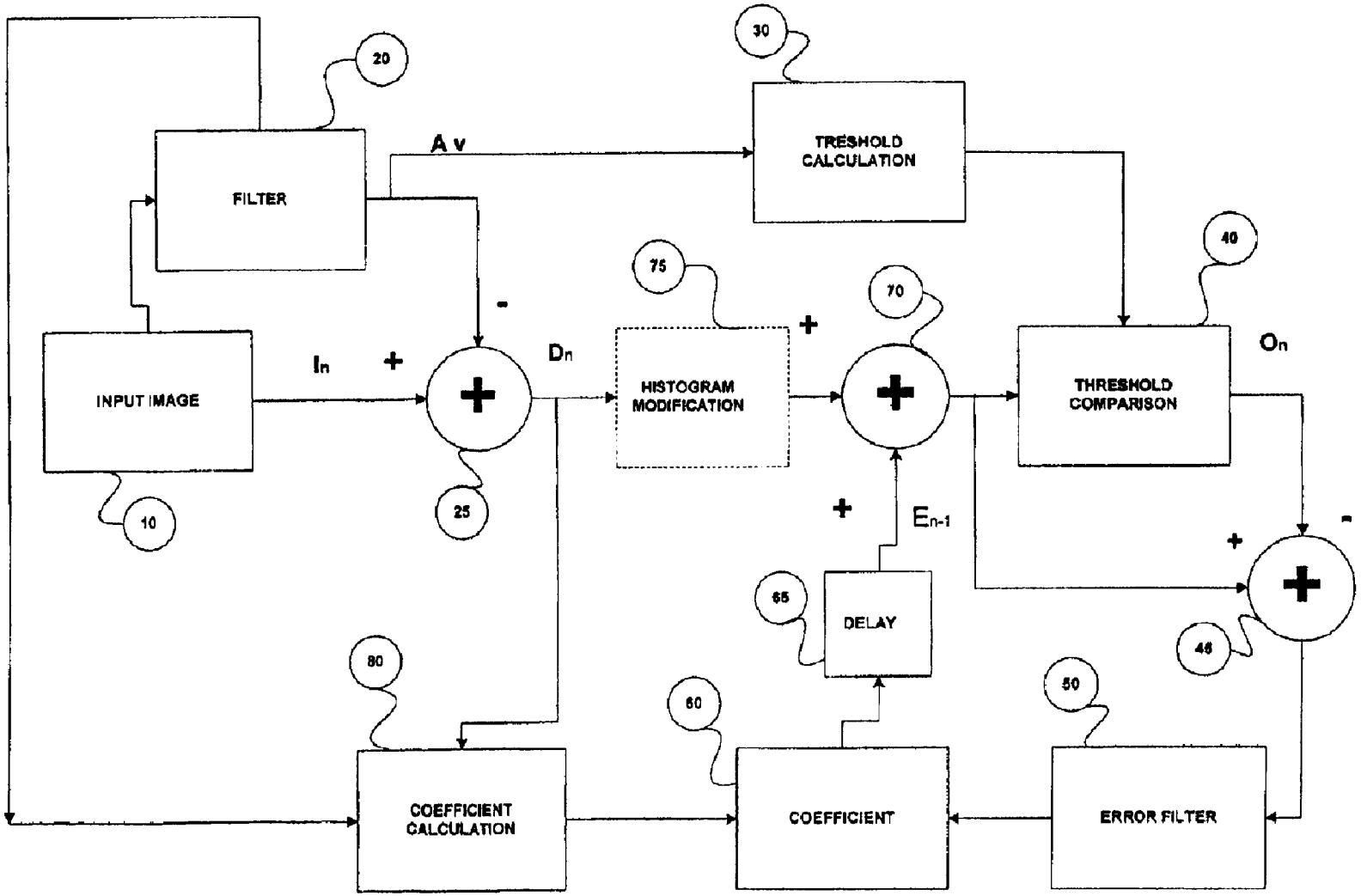
FIG. 2 depicts a block diagram of selected components of another embodiment of the system of this invention for generating a halftone image from a digitized continuous tone input image.

In a specific embodiment, shown in FIG. 2, the output of the filtering block 20, $Av_n$, is given by Equation (2). The threshold calculation 30 is a function of the output of the filtering block 20 and is given by $$t(\ldots, I_k, \ldots, I_n, \ldots) = C_O Av_n \quad (7)$$

which is the same function as in Equation 4 when the output of the filtering block 20, $Av_n$, is given by Equation (2). The output of the coefficient calculation block 80 depends on the output of the filtering block 20, $Av_n$, and the difference $D_n$ and is given by $$C_1 + C_2\{\mathrm{abs}((D_n - Av_n)/Av_n)\} \quad (8)$$

When the output of the filtering block 20, $Av_n$, is given by Equation (2), Equation (8) is the same as Equation (6).

Histogram equalization is included after the summing node 25. The processing of the input image pixels 10 occurs as described in the preceding section.

The value of N in Equation (2) (the extent of the filter), $C_O$, $C_1$, and $C_2$ (first, second parameters and third parameters) can be selected to produce the image of highest perceptual quality at a specific output device. For a WBMP image on a specific monochrome mobile phone display, utilizing a Floyd-Steinberg error filter, the following parameters yield images of high perceptual quality:

$N=7$, $C_O=-20$, $C_1=0.05$, and $C_2=1$.

Figure 2A:
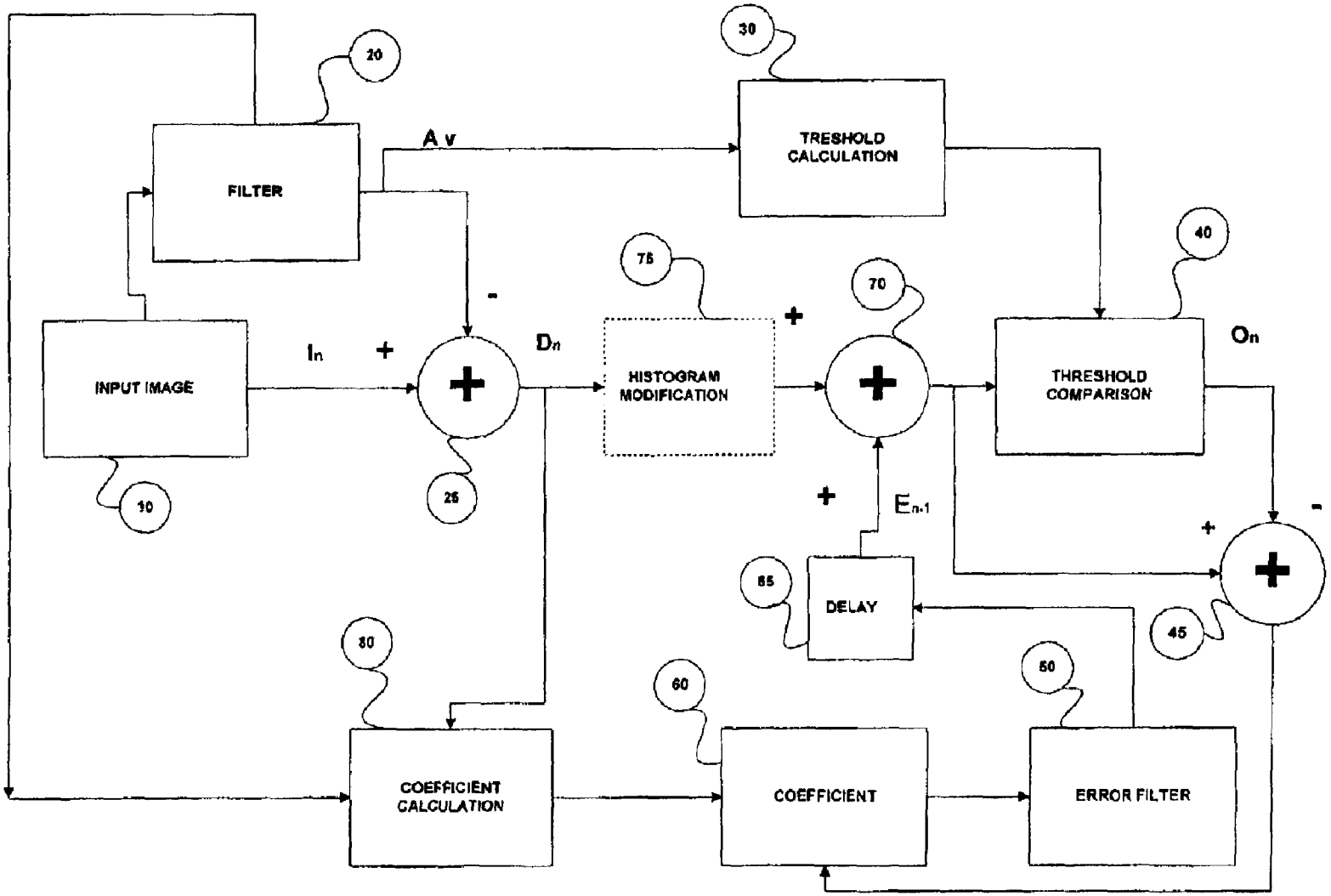
FIG. 2a depicts a block diagram of selected components of another embodiment of the system of this invention for generating a halftone image from a digitized continuous tone input image, where the adaptation coefficient multiplies the input to the error filter block.

In another embodiment, shown in FIG. 2a, the sequence order of error filter block 50 and the adaptation coefficient block 60 are interchanged. In the embodiment of FIG. 2a, in which the adaptation coefficient 60 multiplies the difference between the modified image datum and the output level, the delay block 65 stores the output of the error filter block.

The embodiments described herein can also be expanded to include composite images, such as color images, where each color component might be treated individually by the algorithm. In the case of color input images, the value of N in Equation (2) (the extent of the filter), $C_O$, $C_1$, and $C_2$ (first, second parameters and third parameters) can be selected to control the color difference at a color transition while minimizing any effects on the brightness at that location. Other possible applications of these embodiments include the design of computer generated holograms and the encoding of the continuous tone input data.

Although the embodiments described herein are most easily understood for binary output devices, the embodiments described herein can also be expanded to include rendering an output image when the number of gray levels in the image exceeds that of obtainable in the rendering device. It should be apparent how to expand the embodiments described herein to M-ary displays or M-ary rendering devices (see, for example, "Digital Halftoning" by Robert Ulichney, MIT Press, Cambridge, Mass., and London, England, 1990, p. 341).

It should be appreciated that the various embodiments described above are provided merely for purposes of example and do not constitute limitations of the present invention. Rather, various other embodiments are also within the scope of the claims, such as the following. The filter 20 can be selected to impart the desired functional behavior of the difference. The filter 20 can, for example, be a DC preserving filter. The threshold 40 and the adaptation coefficient 60 can also be selected to impart the desired characteristics of the image.

It should be apparent that Equations (4) and (5) are exemplary forms of functional expressions with parameters that can be adjusted. Functional expressions for the threshold and the adaptation coefficient ,where the expressions include parameters that can be adjusted, will satisfy the object of this invention.

In general, the techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to data entered using the input device to perform the functions described and to generate output information. The output information may be applied to one or more output devices.

Elements and components described herein may be further divided into additional components or joined together to form fewer components for performing the same functions.

Each computer program within the scope of the claims below may be implemented in any programming language, such as assembly language, machine language, a high-level procedural programming language, or an object-oriented programming language. The programming language may be a compiled or interpreted programming language. Each computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output.

The generation of the halftone image can occur at a location remote from the rendering printer or display. The operations performed in software utilize instructions ("code") that are stored in computer-readable media and store results and intermediate steps in computer-readable media.

Common forms of computer-readable media include, for example, a floppy disk, a flexible disk, hard disk, magnetic tape, or any other magnetic medium, a CDROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read. Electrical, electromagnetic or optical signals that carry digital data streams representing various types of information are exemplary forms of carrier waves transporting the information.

Other embodiments of the invention, including combinations, additions, variations and other modifications of the disclosed embodiments will be obvious to those skilled in the art and are within the scope of the following claims.

What is claimed is:

1. A method of generating a halftone image from an input digital image, said *input* digital image represented by a multiplicity of pixels, each pixel having a given value, [said values being stored in a memory,] said method comprising [the steps of]:

[(A)] determining [the] *one or more* properties [including local properties] of the *input* digital image;

[(B)] filtering the input digital image, said filtering having as output a filtered value at each pixel;

[(C)] obtaining the difference between the value at [the] *a* pixel and the filtered value at the pixel, said difference being a threshold input;

[(D)] generating [the] *an* output state for the pixel depending upon the relationship of the [value of said] threshold input relative to a threshold;

[(E)] producing an error value, said error value being indicative of the deviation of said threshold input from the output state;

[(F)] multiplying said error value by a coefficient, the result of said multiplication being stored;

[(G)] combining the stored value with the difference between the next pixel value and the next filtered value to produce a new threshold input;

[(H)] repeating [steps (D) through (G)] *the generating an output state, the producing an error value, the multiplying said error value, and the combining the stored error value* for each pixel in the *input* digital image thereby producing a halftone image; [and]

varying the threshold according to *the one or more* properties of the *input* digital image; and selectively changing the coefficient [in step (E)] according to the [local] *one or more* properties of the *input* digital image.

2. The method of claim 1 further comprising [the step of]:

performing a histogram modification of the image pixels, before [step (B)] *filtering the input digital image*.

3. The method of claim 1 further comprising the step of:

performing a histogram modification of the difference between the value at the pixel and the filtered value at the pixel, before [step (D)] *generating the output state*.

4. The method of claim 1 wherein the selectively changing of the coefficient comprises:

dividing a first function of the [local] *pixel* values of the *input* digital image by a second function of the [local] *pixel* values of the *input* digital image; and multiplying the absolute value of the result of said division by a first parameter; and adding a second parameter to the result of the multiplication, thereby obtaining the coefficient.

5. The method of claim 4 wherein said first function is the difference between the value at the pixel and the filtered value at the pixel and said second function is the filtered value at the pixel.

6. The method of claim 4 wherein the threshold is a third function of the [local] *pixel* values of the *input* digital image.

7. The method of claim 6 wherein said third function is a linear function of the [local] *pixel* values of the *input* digital image.

[8. The method of claim 6 wherein said third function is a linear function of the local values of the digital image.]

9. The method of claim 4 wherein the threshold is the filtered value at the pixel multiplied by a third parameter.

10. The method of claim 9 wherein the [filter in step (B) is] *filtering comprises using* a filter of finite extent, the extent of the filter, the first *parameter*, *the* second [parameters] *parameter* and *the* third [parameters] *parameter* being selected to produce [the] *an* image of highest perceptual quality at a specific output device.

11. The method of claim 9 further comprising [the step of]:

performing a histogram modification of the difference between the value at the pixel and the filtered value at the pixel, before [step (D)] *generating the output state*.

12. The method of claim 1 wherein the input digital image is a monochrome image.

13. The method of claim 1 wherein the input digital image is a color image.

14. A system for generating a halftone image from an input digital image, said *input* digital image represented by a multiplicity of pixels, each pixel having a given value, [said values being stored in a memory,] said [apparatus] *system* comprising:

means for determining [the] *one or more* properties [including local properties] of said *input* digital image; and means for retrieving the pixel values; and means for filtering the input digital image, said filtering having as output a filtered value at each pixel; and means for obtaining the difference between the value at [the] *a* pixel and the filtered value at the pixel, said difference being a threshold input; and means for producing an error value, said error value being indicative of the deviation of said threshold input from [the] *an* output state; and means for multiplying said error value by an adaptation coefficient to obtain a diffused value and means for storing the diffused value and delaying said stored *diffused* value by one pixel; and means for combining the stored delayed diffused value with the difference between the pixel value and the filtered value; and means for varying [the] *a* threshold according to the *one or more* properties of the *input* digital image at the pixel value; and means for selectively changing the adaptation coefficient according to the [local] *one or more* properties of the *input* digital image.

15. The system of claim 14 further comprising:

means performing a histogram modification of the image pixels.

16. The system of claim 14 further comprising:

means for performing a histogram modification of the difference between the value at the pixel and the filtered value at the pixel.

17. The system of claim 14 wherein the means for selectively changing of the adaptation coefficient comprise:

means for dividing a first function of the [local] *pixel* values of the *input* digital image by a second function of the [local] *pixel* values of the *input* digital image; and means for multiplying the absolute value of the result of said division by a first parameter; and adding a second parameter to the result of the multiplication, thereby obtaining the *adaptation* coefficient.

18. A computer program product comprising:

a computer usable *storage* medium having computer readable code embodied therein for generating a halftone image from an input digital image, said *input* digital image represented by a multiplicity of pixels, each pixel having a given value, [said values being stored in a memory,] said code [causing] *comprising instructions for* a computer system [to:], *the instructions comprising:*

*instructions to* determine [the] *one or more* properties [including local properties] of said *input* digital image; and

*instructions to* retrieve the pixel values; and

*instructions to* filter the *input* digital image, said filtering having as output a filtered value at each pixel; and

*instructions to* obtain the difference between the value at [the] *a* pixel and the filtered value at the pixel, said difference being a threshold input; and

*instructions to* produce an error value, said error value being indicative of the deviation of said threshold input from [the] *an* output state; and

*instructions to* multiply said error value by an adaptation coefficient to obtain a diffused value; and

*instructions to* store the diffused value and [delaying] *delay* said stored *diffused* value by one pixel; and

*instructions to* combine the stored delayed diffused value with the difference between the pixel value and the filtered value; and

*instructions to* vary [the] *a* threshold according to the *one or more* properties of the *input* digital image at the pixel value; and

*instructions to* selectively change the adaptation coefficient according to the [local] *one or more* properties of the *input* digital image.

19. The computer program product of claim 18 [where, the computer readable code further causes the computer system to] *wherein the instructions further comprise*:

*instructions to* perform a histogram modification of the image pixels.

20. The computer program product of claim 18 [where, the computer readable code further causes the computer system to] *wherein the instructions further comprise*:

*instructions to* perform a histogram modification of the difference between the value at the pixel and the filtered value at the pixel.

21. The computer program product of claim 18 [where, the computer readable code in causing the computer system] *wherein the instructions* to selectively change the adaptation coefficient[, further causes the computer system to] *comprise*:

*instructions to* divide a first function of the [local] *pixel* values of the *input* digital image by a second function of the [local] *pixel* values of the *input* digital image; and

*instructions to* multiply the absolute value of the result of said division by a first parameter; and

*instructions to* add a second parameter to the result of the multiplication, thereby obtaining the *adaptation* coefficient.

22. The computer program product of claim 21 wherein said first function is the difference between the value at the pixel and the filtered value at the pixel and said second function is the filtered value at the pixel.

23. The computer program product of claim 22 wherein [said] the threshold is the filtered value at the pixel multiplied by a third parameter.

24. The computer program product of claim 23 wherein the filter used to filter the *input* digital image is a filter of finite extent, the extent of the filter, the first *parameter*, *the* second [parameters] *parameter* and third [parameters] *parameter* being selected to produce [the] *an* image of highest quality at a specific output device.

25. The computer program product of claim [25 where, the computer readable code further causes the computer system to] *18 wherein the instructions further comprise*:

*instructions to* perform a histogram modification of the difference between the value at the pixel and the filtered value at the pixel.

26. The computer program product of claim 21 wherein the threshold is a third function of the [local] *pixel* values of the *input* digital image.

27. The computer program product of claim 26 wherein said third function is a linear function of the [local] *pixel* values of the *input* digital image.

[28. The computer program product of claim 26 wherein said third function is a linear function of the local values of the digital image.]

29. The computer program product of claim 18 wherein the input digital image is a color image.

30. The computer program product of claim 18 wherein the input digital image is a monochrome image.

*31. The system of claim 14, further comprising: a rendering device.*

*32. The system of claim 31, wherein said rendering device is a binary output device.*

*33. The system of claim 31, wherein said rendering device is a M-ary display or a M-ary rendering device.*

*34. The system of claim 31, wherein said rendering device is a mobile phone display.*

*35. A mobile device capable of generating a halftone image from an input digital image, said input digital image represented by a multiplicity of pixels, each pixel having a given value, said mobile device comprising:*

*means for determining one or more properties of said input digital image;*

*means for retrieving the pixel values;*

*means for filtering the input digital image, said filtering having as output a filtered value at each pixel;*

*means for obtaining the difference between the value at a pixel and the filtered value at the pixel, said difference being a threshold input;*

*means for producing an error value, said error value being indicative of the deviation of said threshold input from an output state;*

*means for multiplying said error value by an adaptation coefficient to obtain a diffused value and means for storing the diffused value and delaying said stored diffused value by one pixel;*

*means for combining the stored delayed diffused value with the difference between the pixel value and the filtered value;*

*means for varying a threshold according to the one or more properties of the input digital image at the pixel value;*

*means for selectively changing the adaptation coefficient according to the one or more properties of the input digital image; and*

*a rendering device.*

* * * * *

UNITED STATES PATENT AND TRADEMARK OFFICE

CERTIFICATE OF CORRECTION

PATENT NO. : RE42,473 E
APPLICATION NO. : 11/847894
DATED : June 21, 2011
INVENTOR(S) : Gorian et al.

It is certified that error appears in the above-identified patent and that said Letters Patent is hereby corrected as shown below:

Title page
Page 3, item (56), under "Other Publications", in Column 2, Line 19, delete "Oct. 2, 2004, U.S. Appl. No. 10/080,833, filed Feb. 22, 2003." and insert -- Mar. 29, 2004, U.S. Appl. No. 10/080,883, filed Feb. 22, 2002. --.

Page 3, item (56), under "Other Publications", in Column 2, Line 21, delete "2003," and insert -- 2004, --.

Page 4, item (56), under "Other Publications", in Column 2, Line 31, delete "Rendenring"," and insert -- Rendering", --.

Column 10, line 12, in Claim 15, delete "means performing" and insert -- means for performing --.

Signed and Sealed this
Eleventh Day of October, 2011

David J. Kappos

David J. Kappos
*Director of the United States Patent and Trademark Office*